(No Model.)

D. RUGE.
Profile Gage.

No. 241,241. Patented May 10, 1881.

WITNESSES:

INVENTOR:
Detlef Ruge
by Joseph A. Miller
Atty

UNITED STATES PATENT OFFICE.

DETLEF RUGE, OF PROVIDENCE, RHODE ISLAND.

PROFILE-GAGE.

SPECIFICATION forming part of Letters Patent No. 241,241, dated May 10, 1881.

Application filed February 5, 1881. (No model.)

*To all whom it may concern:*

Be it known that I, DETLEF RUGE, of the city and county of Providence, and State of Rhode Island, have invented a new and useful Improvement in Profile-Gages; and I hereby declare the following to be a full, clear, and exact description of the same, reference being had to the accompanying drawings, forming part of this specification.

This invention has reference to a simple portable tool or instrument, with which the profile of a molding, a piece of carving, or any irregular form can be quickly and accurately taken.

The invention consists in securing between two flat surfaces a large number of flat-sided rods, and in covering one or both of the surfaces with a yielding material, so as to allow the rods to slide easily; and it further consists in providing such device with a clamp to firmly secure the rods.

Figure 1:
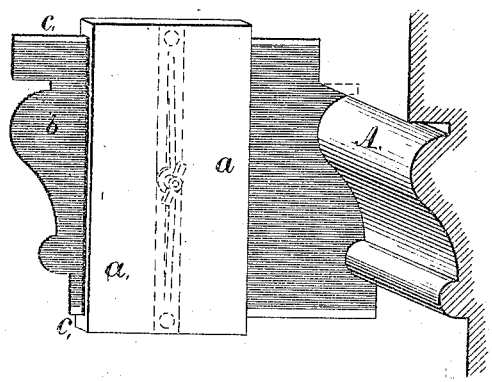
Figure 2:
Figure 4:
Figure 3:
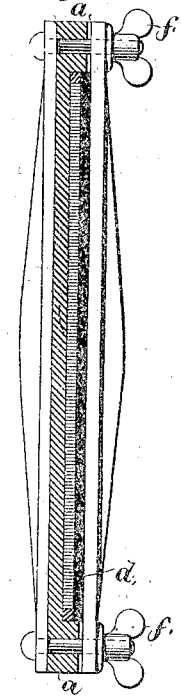

Figure 1 is a perspective view of my improved profile-gage, showing the same as used for taking the profile or sectional outline of a molding. Fig. 2 is a sectional view of the device, showing the square rods and the yielding surface or packing. Fig. 3 is a sectional view showing the application of a clamp, by means of which the rods can be firmly secured after the outline of any article has been taken. Fig. 4 is a view of one of the flat-sided rods.

In the drawings, $a$ is a holder, made of wood, metal, or other suitable material, consisting of two flat sides secured together so as to inclose between them the rods $b\ b$, which, to take an accurate profile, should be made quite thin, as is shown in the drawings, and preferably of drawn or rolled metal, so as to be of uniform thickness.

$c\ c$ are larger rods placed at the ends, so as to protect the rods $b\ b$ and prevent them from yielding laterally.

$d$ is an elastic surface secured to one side of the holder and bearing on the rods $b\ b$ to form a yielding cushion. This cushion may be made of india-rubber, felt, cork, or other substance, which, while forming a yielding pressure on all the rods, will allow any one of them to slide independently of the others.

A is a molding of which, as shown in Fig 1, a profile is being taken. This is done by simply pressing the device against the molding, when the rods $b\ b$, which meet the projecting portions of the molding, are pushed back and the rests are pushed forward until they also meet the resistance offered by the depressed portions of the molding.

This device can be used to take the profile of any carved or cast surface, so that accurate copies may be made therefrom by drawing lines over such a surface and taking a copy of the profile, which may then be copied, or a tracing of the same made.

In nearly all mechanical branches this device will save labor and time, and will facilitate the exact reproduction of the article to be duplicated.

When, after a profile has been taken, it is desirable to use the device for making duplicates, it is desirable to secure the rods against accidental displacement. For this purpose a clamp of any suitable form is used, by which the rods can be firmly secured.

Fig. 3 shows a clamp secured by means of the clamp-screws $f\ f$. This clamp may form a narrow strip in the holder, as is indicated in broken lines in Fig. 1, or it may be near one side of the holder, so that by screwing down the clamp all the rods will be firmly retained in the position they then occupy.

Having thus described my invention, I claim as new and desire to secure by Letters Patent—

1. A profile-gage consisting of a holder, and a number of flat-sided rods arranged in said holder upon a yielding surface adapted to permit each rod to move independently in taking a profile, as described.

2. The combination, with the holder $a$, of the rods $b$ arranged within it, the rods $c$, between which the rods $b$ are confined, and the yielding surface $d$ within the holder and bearing upon the rods, as and for the purpose set forth.

3. A profile-gage consisting of a holder in which a number of rods are laid side by side, a yielding pressure-surface bearing on the rods, and a clamp by which the rods are firmly secured in a given position, as described.

DETLEF RUGE.

Witnesses:
J. A. MILLER, Jr.,
JOSEPH A. MILLER.